(12) United States Patent
Lee et al.

(10) Patent No.: US 8,256,838 B2
(45) Date of Patent: Sep. 4, 2012

(54) ACTIVE HEADREST

(75) Inventors: In-Ho Lee, Gyeonggi-do (KR);
Do-Hyung Kim, Seoul (KR);
Tae-Hyoung Yang, Seoul (KR);
Jong-Yoon Lee, Seoul (KR); Sang-Nam Park, Chungcheongnam-do (KR)

(73) Assignee: Dymos Incorporated (KR)

( * ) Notice: Subject to any disclaimer, the term of this patent is extended or adjusted under 35 U.S.C. 154(b) by 319 days.

(21) Appl. No.: 12/712,279

(22) Filed: Feb. 25, 2010

(65) Prior Publication Data

US 2011/0204686 A1 Aug. 25, 2011

(51) Int. Cl.
*B60N 2/427* (2006.01)
*B60R 21/055* (2006.01)

(52) U.S. Cl. .................................................. 297/216.12

(58) Field of Classification Search .............. 297/216.12
See application file for complete search history.

(56) References Cited

U.S. PATENT DOCUMENTS 7,070,205 B2 * 7/2006 Becker et al. ........ 297/216.12 X
2010/0127540 A1 * 5/2010 Park et al. ................ 297/216.12

* cited by examiner

*Primary Examiner* — Rodney B White
(74) *Attorney, Agent, or Firm* — Hoffmann & Baron, LLP

(57) ABSTRACT

An active headrest has a simple structure so that injuries of the neck and a portion near the neck of a passenger can be effectively prevented in the event of a rear-end collision and forward and rearward inclinations of the active headrest can be adjusted in an ordinary driving state to improve user's convenience and shake of the active headrest with respect to a vehicle seat in an ordinary state can be prevented to suppress noise and vibration and the quality of the vehicle seat and the car can be improved.

14 Claims, 18 Drawing Sheets

ACTIVE HEADREST

BACKGROUND OF THE INVENTION

1. Field of the Invention

The present invention relates to a mechanism having a simple structure in which neck injury of a passenger can be effectively prevented in the event of a rear-end collision of a car.

2. Description of the Related Art

When a rear-end collision has taken place due to a rear car during car driving, the car is rapidly accelerated, and the head of a vehicle occupant is rearwardly leant back, and thus the neck of the vehicle occupant is seriously injured. In this case, a headrest installed in an upper portion of a seat back supports the head (back of the head) of the vehicle occupant to reduce the degree of injury.

However, generally, the head of a passenger, in particular, the head of a driver is spaced apart from the headrest by a predetermined distance during car driving. Thus, in a rear-end collision, the headrest does not support the head of the passenger. Thus, the neck of the passenger is rapidly leant back and may be seriously injured.

In an attempt to solve this problem, headrest mechanisms in which a headrest is moved forwardly and upwardly (a direction in which the headrest is simultaneously moved forwardly and upwardly toward the back of the head of the passenger) and the head of the passenger is quickly supported so that injuries of the neck and a portion near the neck of the passenger can be prevented, have been developed.

However, general active headrest mechanisms have complicated structures and thus cause an increase in costs for a vehicle seat and a car.

Meanwhile, convenience devices such as inclination angle adjusting devices (swing devices) and forward and rearward position adjusting devices are added to recent high-grade car headrests so that the head of the passenger can be more comfortably supported according to various body conditions of passengers.

However, due to a limited space of the headrest, it is very difficult to additionally install the above-mentioned convenience devices in the above-described active headrest mechanisms.

Meanwhile, in the above-described active headrest mechanisms, the headrest may be slightly shaken with respect to the vehicle seat before the headrest operates, i.e., in an ordinary car driving state. This is because the headrest is not permanently secured to the vehicle seat of the car and needs to be quickly relatively moved from the vehicle seat in the event of a rear-end collision. Thus, the problem is a general phenomenon due to implementation of the active headrest mechanisms.

However, shake of the headrest causes inconvenience and anxiety to a user and noise and vibration and furthermore causes doubts about the quality of the vehicle seat and the car.

SUMMARY OF THE INVENTION

The present invention provides an active headrest having a simple structure in which injuries of the neck and a portion near the neck of a passenger can be effectively prevented in the event of a rear-end collision and forward and rearward inclinations of the active headrest can be adjusted in an ordinary driving state to improve user's convenience and shake of the active headrest with respect to a vehicle seat in an ordinary state can be prevented to suppress noise and vibration and the quality of the vehicle seat and the car can be improved.

According to an aspect of the present invention, there is provided an active headrest including: a guide bar installed at an upper side of a seat back; a pair of sliders that are slidable on the guide bar upwardly and downwardly; a moving bar pivotably coupled to the sliders so that the moving bar is pivoted around the guide bar forwardly and rearwardly; a front cover coupled to an upper side of the moving bar; a pivoting guide unit pivoting the upper side of the moving bar forwardly as the sliders are raised toward the guide bar; a driving spring providing an elastic force for pushing the sliders upwardly; and a latch unit maintaining a state where the sliders compress the driving spring and are fallen.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining exemplary embodiments of the invention with reference to the attached drawings.

Figure 1:
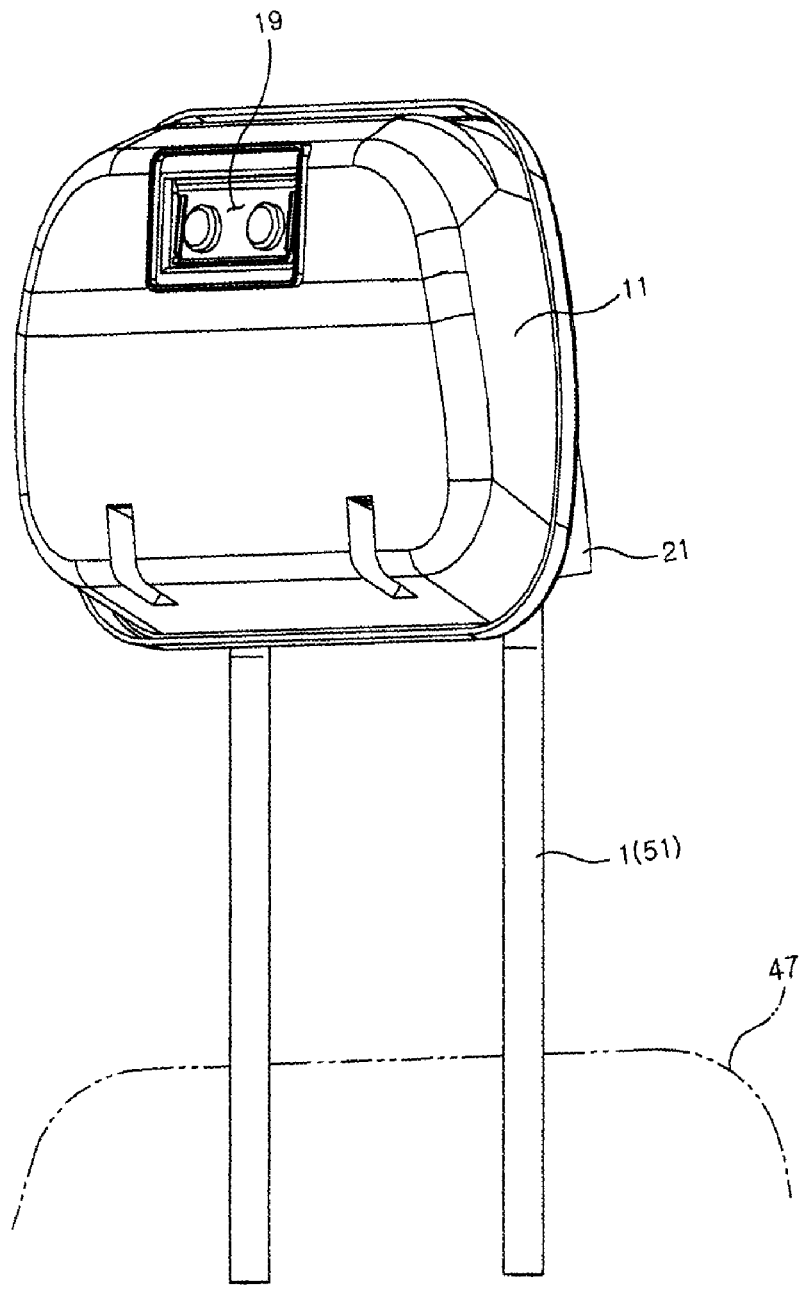
FIG. 1 is a perspective view of an active headrest according to an embodiment of the present invention.
Figure 2:
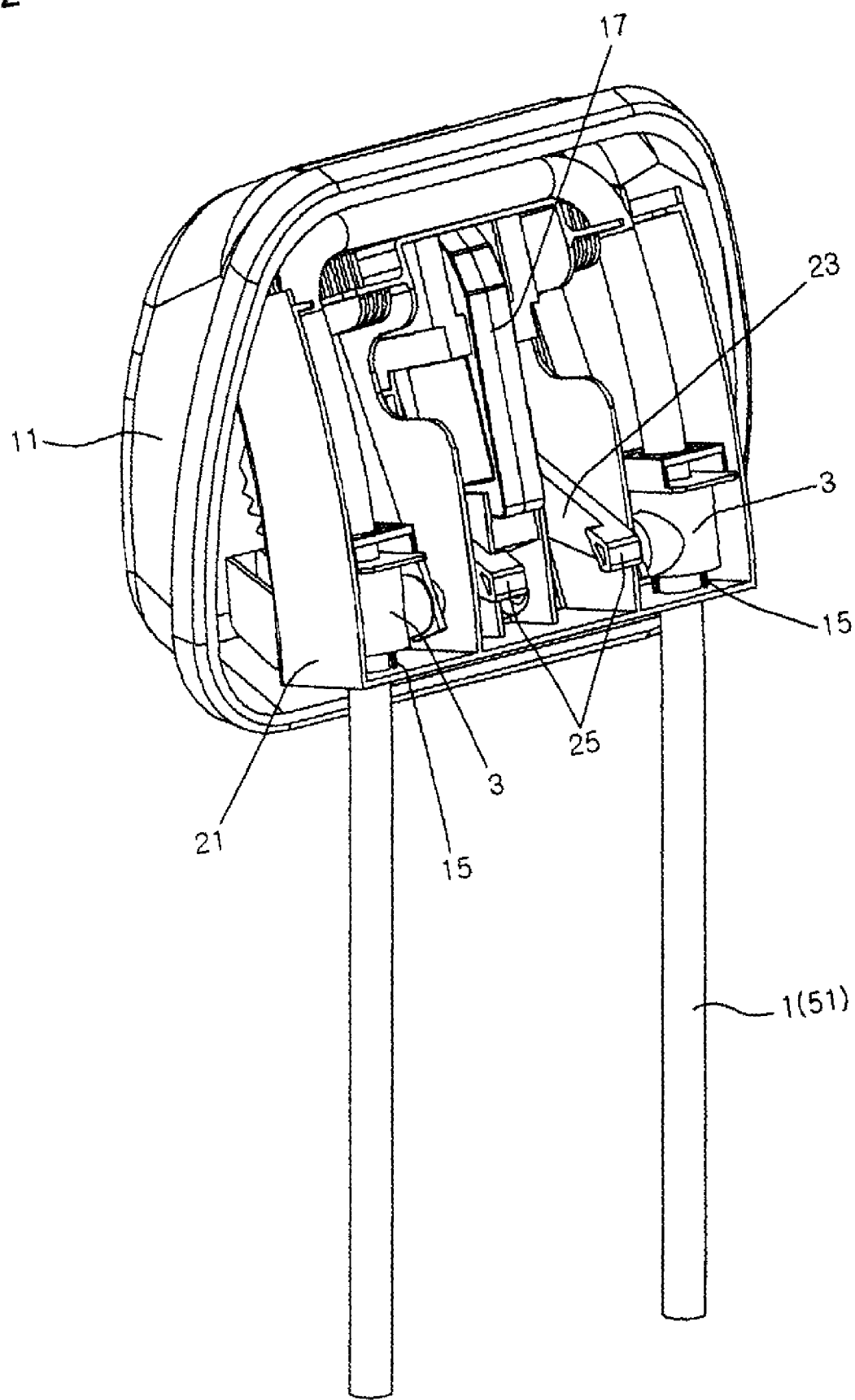
FIG. 2 is a perspective view of the active headrest of FIG. 1 in a direction opposite to the direction of FIG. 1.
Figure 3:
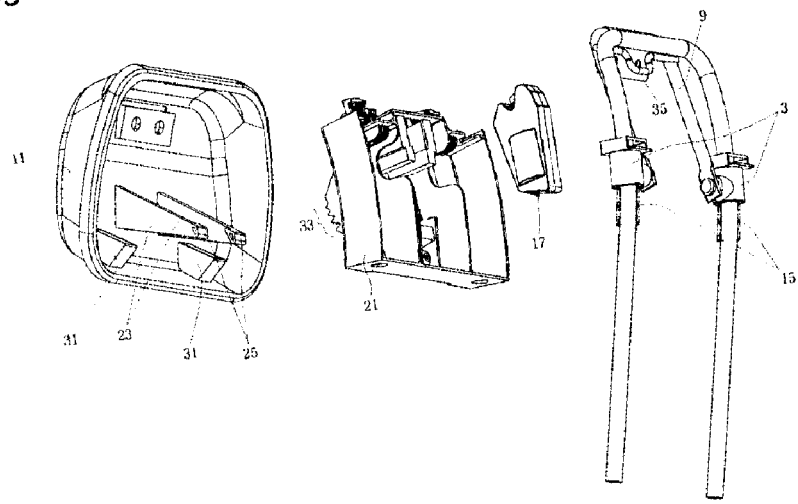
FIG. 3 is an exploded perspective view of the active headrest of FIG. 1 at an angle of FIG. 2.
Figure 4:
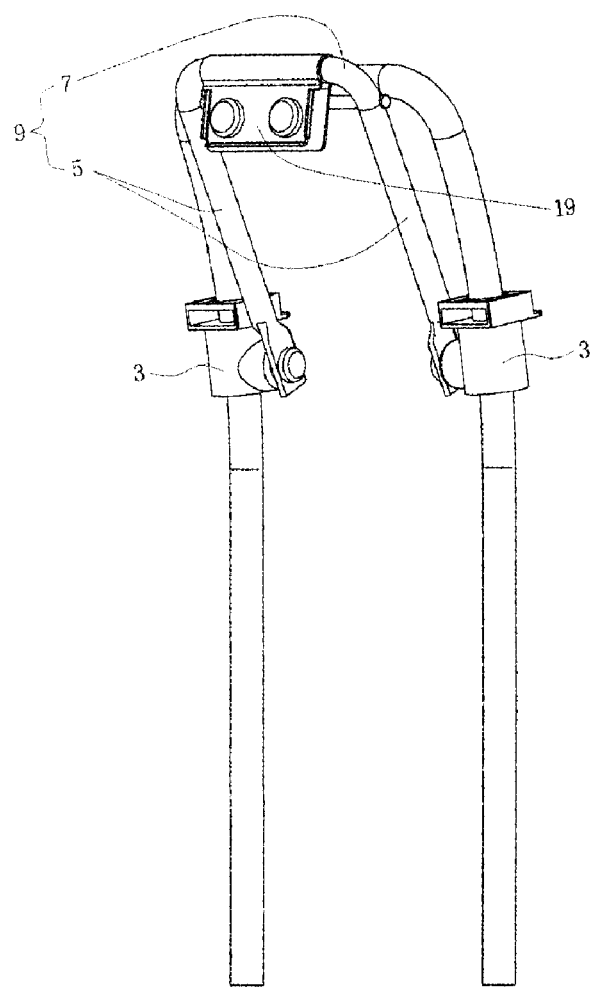
FIG. 4 is a perspective view illustrating the relationship between a stay rod, a moving bar, and a pair of sliders of the active headrest of FIG. 1.
Figure 5:
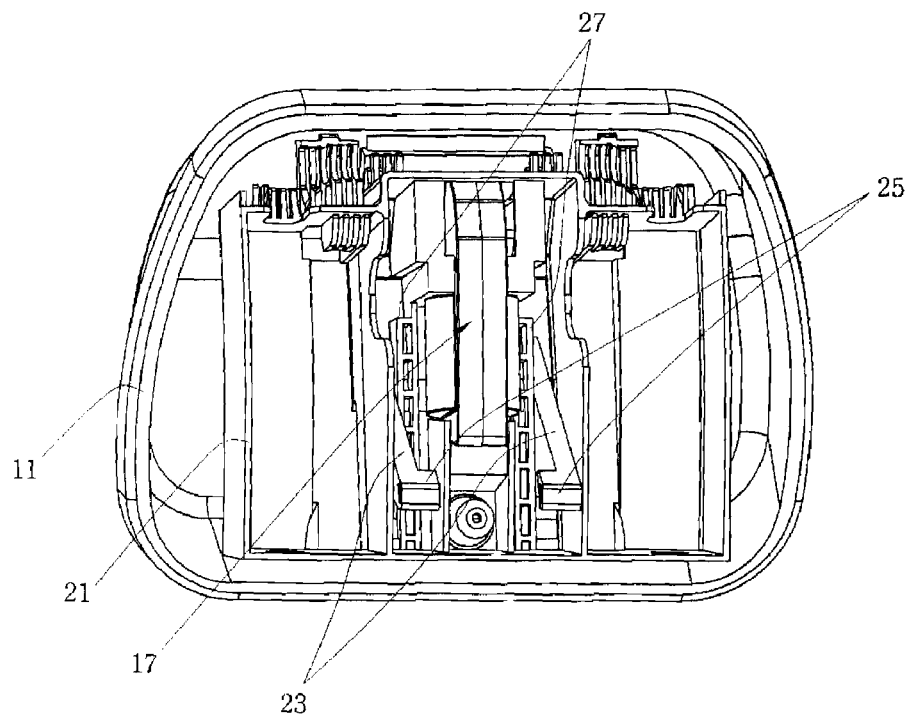
FIG. 5 is a perspective view illustrating a state where a front cover and a main body of the active headrest of FIG. 1 are coupled to each other.
Figure 6:
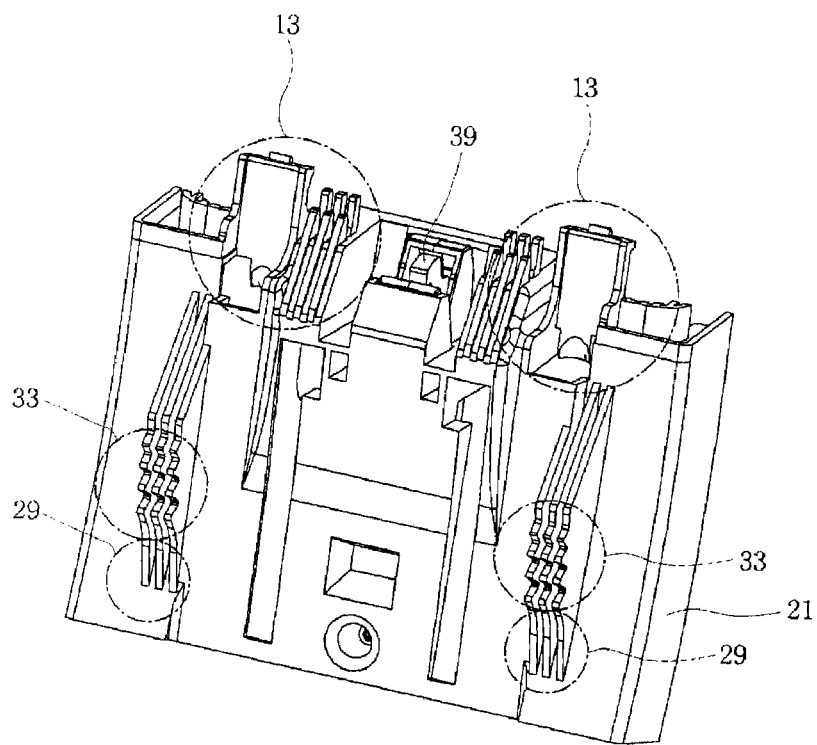
FIG. 6 is a perspective view of a front side of the main body of FIG. 5.
Figure 7:
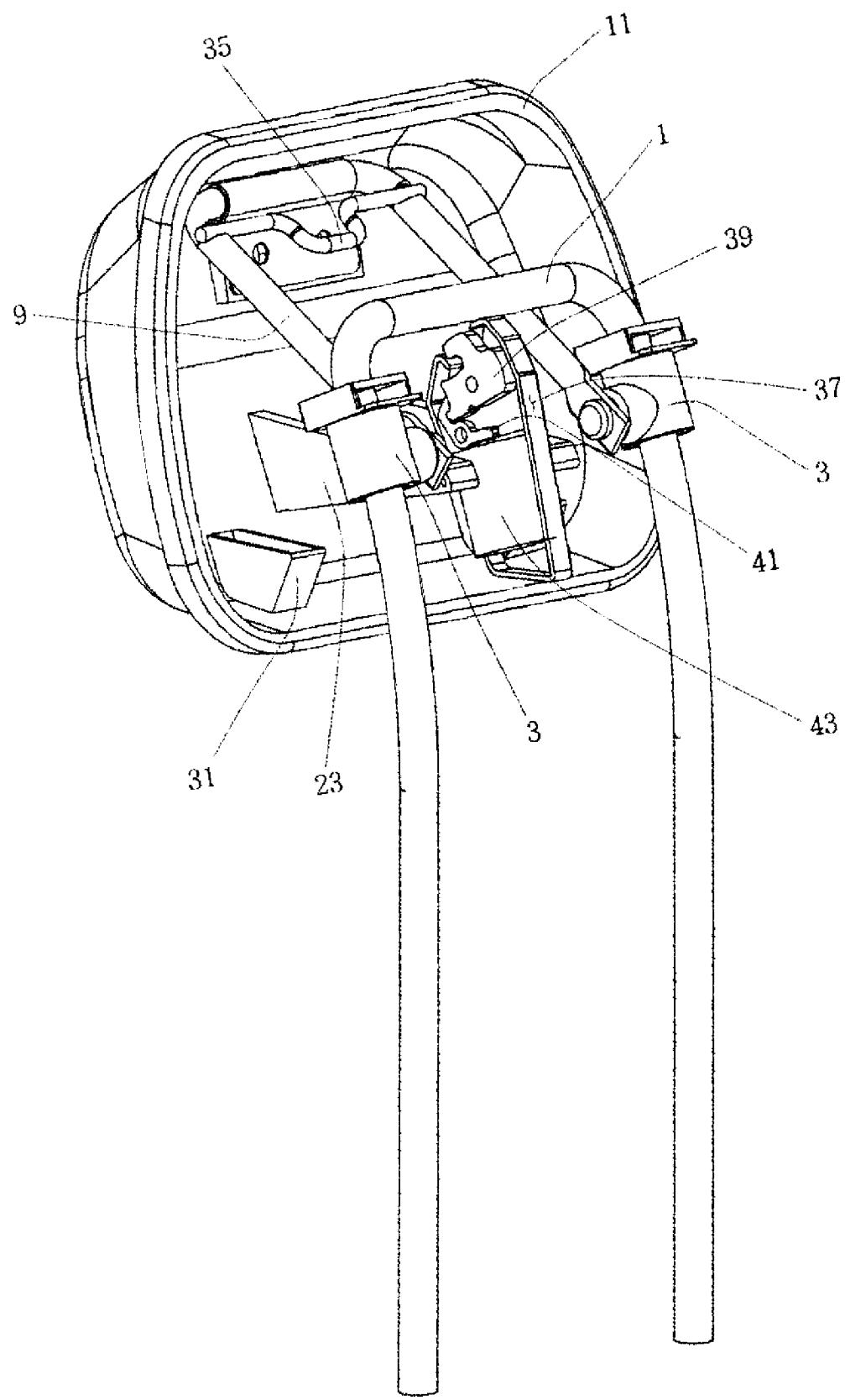
FIG. 7 is a perspective view illustrating the relationship between a latch unit and a lock bar in a state where the sliders and the moving bar are raised.
Figure 8:
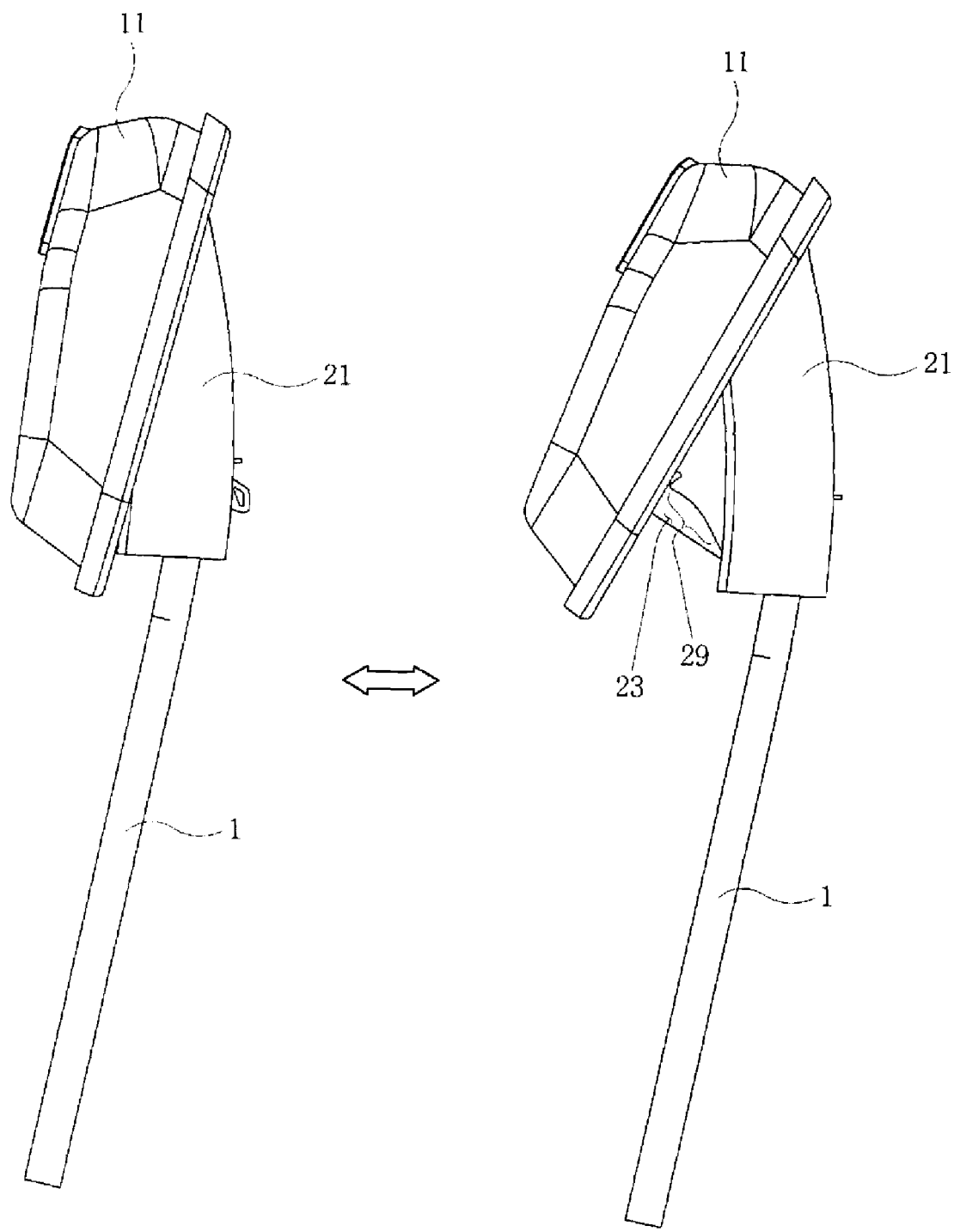
FIG. 8 is a perspective view illustrating a function of swinging a lower end of the front cover forwardly and rearwardly.
Figure 9:
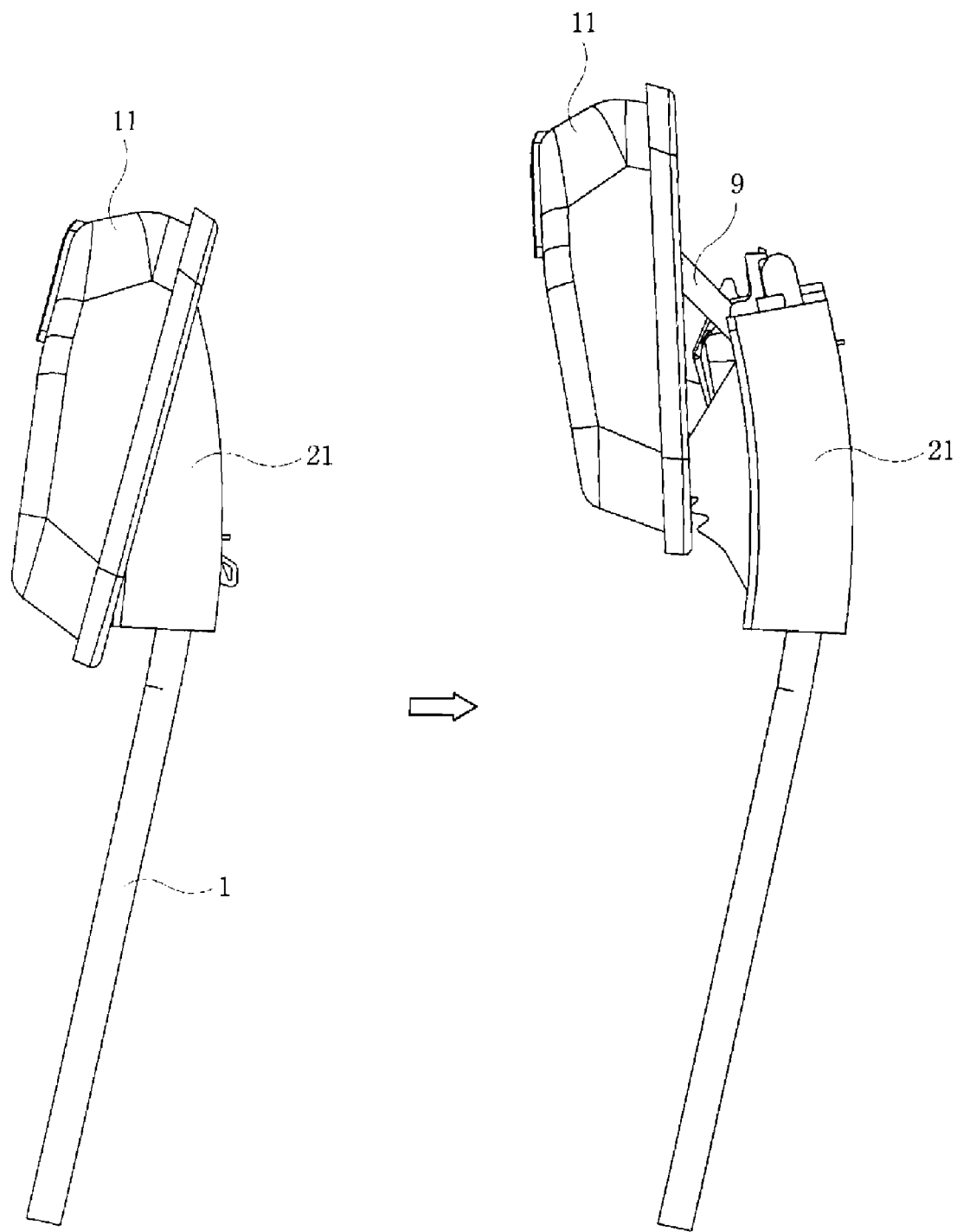
FIG. 9 is a perspective view illustrating a function of preventing injury of the neck of a passenger when the front cover is raised forwardly and upwardly.
Figure 10:
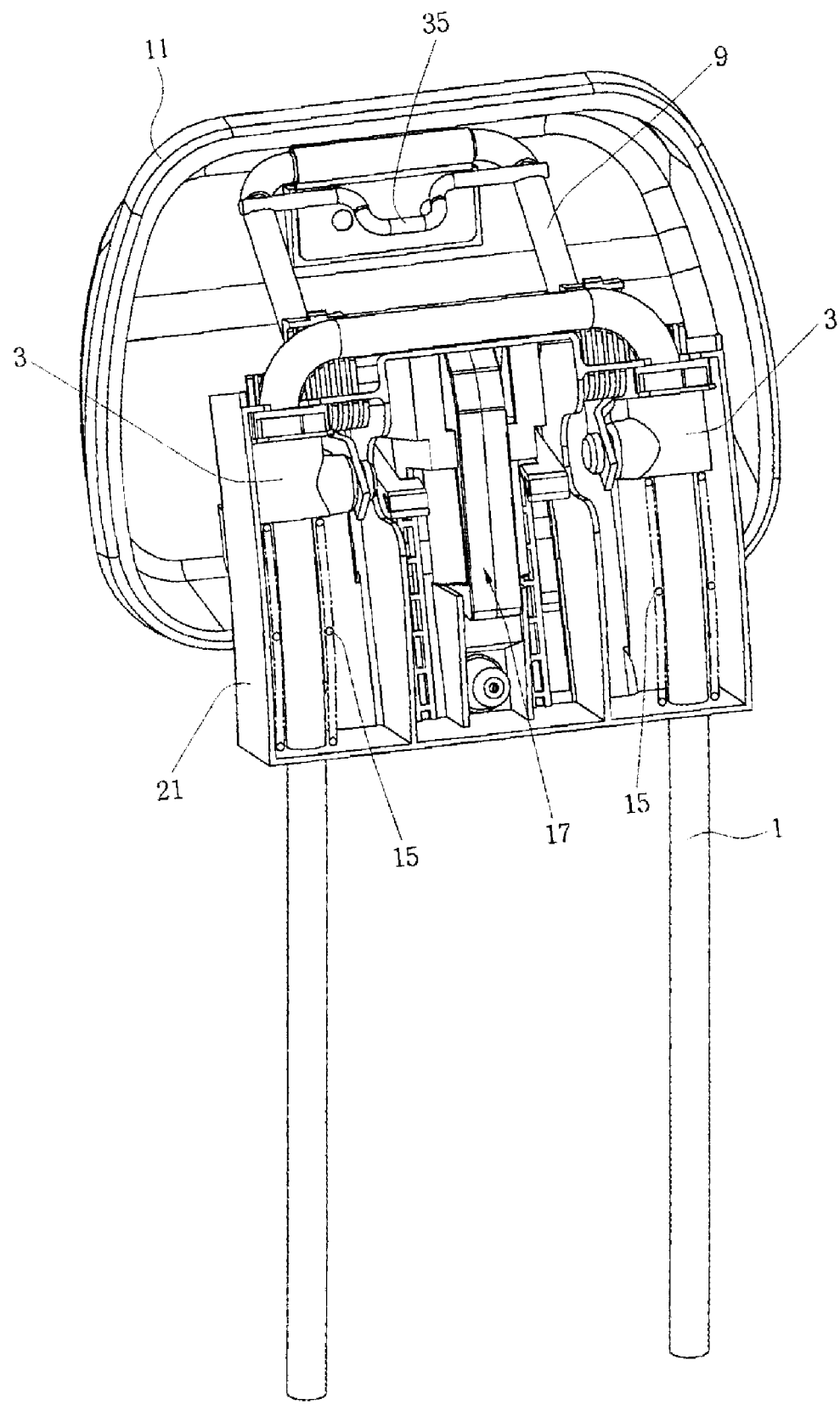
FIGS. 10 and 11 are perspective views illustrating a state where the moving bar and the front cover are raised and injury of the neck of the passenger is prevented, at different angles, respectively.
Figure 11:
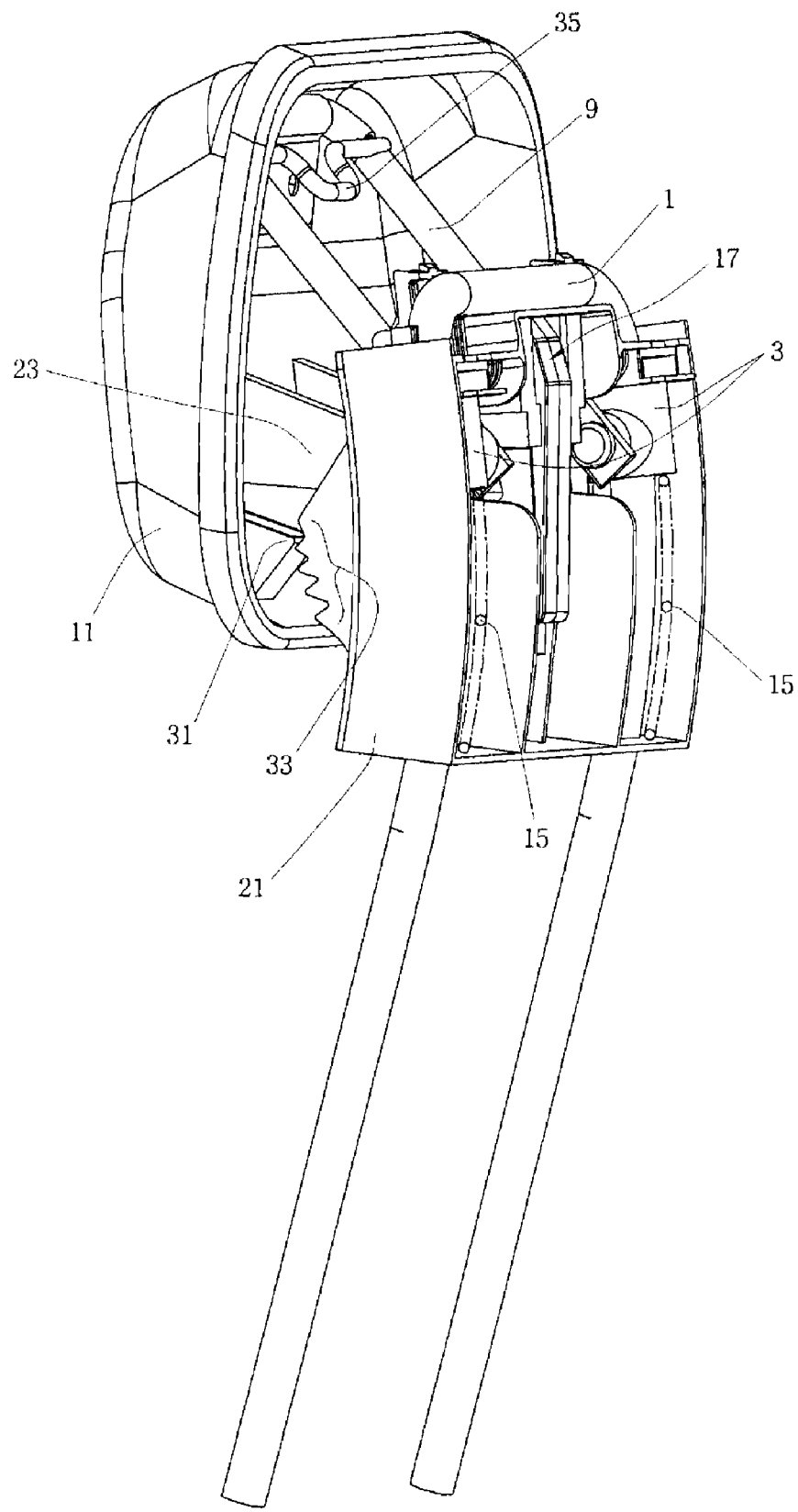

FIGS. 1 through 11 are perspective views of an active headrest according to an embodiment of the present invention. FIG. 1 is a perspective view of an active headrest according to an embodiment of the present invention, and FIG. 2 is a perspective view of the active headrest of FIG. 1 in a direction opposite to the direction of FIG. 1, and FIG. 3 is an exploded perspective view of the active headrest of FIG. 1 at an angle of FIG. 2, and FIG. 4 is a perspective view illustrating the relationship between a stay rod, a moving bar, and a pair of sliders of the active headrest of FIG. 1, and FIG. 5 is a perspective view illustrating a state where a front cover and a main body of the active headrest of FIG. 1 are coupled to each other, and FIG. 6 is a perspective view of a front side of the main body of FIG. 5, and FIG. 7 is a perspective view illustrating the relationship between a latch unit and a lock bar in a state where the sliders and the moving bar are raised, and FIG. 8 is a perspective view illustrating a function of swinging a lower end of the front cover forwardly and rearwardly, and FIG. 9 is a perspective view illustrating a function of preventing injury of the neck of a passenger when the front cover is raised forwardly and upwardly, and FIGS. 10 and 11 are perspective views illustrating a state where the moving bar and the front cover are raised and injury of the neck of the passenger is prevented, at different angles, respectively.

Referring to FIGS. 1 through 7, the active headrest according to the present embodiment includes a guide bar 51 that is integrated with a stay rod 1 installed at an upper side of a seat back 47, wherein the stay rod 1 serves as the guide bar 51.

In detail, the active headrest of FIG. 1 includes: the stay rod 1 installed at the upper side of the seat back 47; a pair of sliders 3 that are slidable on the stay rod 1 upwardly and downwardly; a moving bar 9 pivotably coupled to the sliders 3 so that the moving bar 9 may be pivoted around the stay rod 1 forwardly and rearwardly; a front cover 11 coupled to an upper side of the moving bar 9; a pivoting guide unit 13 that pivots the upper side of the moving bar 9 forwardly as the sliders 3 are raised toward the stay rod 1; a driving spring 15 that provides an elastic force for pushing the sliders 3 upwardly; and a latch unit 17 that maintains a state where the sliders 3 compress the driving spring 15 and are fallen.

In the present embodiment, the stay rod 1 includes at least two parallel linear paths upwardly and downwardly and is installed at the upper side of the seat back 47, and the sliders 3 are coupled to the stay rod 1 to be slidable along the linear paths of the stay rod 1.

In the present embodiment, the moving bar 9 includes two vertical portions 5 and a horizontal portion 7 that connects the vertical portions 5 each other, and lower ends of the vertical portions 5 are pivotably coupled to the sliders 3 so that the moving bar 9 may be pivoted around the stay rod 1 in forward and rearward directions.

The forward and rearward directions are forward and rearward directions of a car in a state where a seat is installed toward a front side of the car. An additional cushion member or the like is disposed on the front cover 11 so that the neck and the head of the passenger may be comfortably supported by the additional cushion member or the like.

The stay rod 1 has a structure in which its upper side for guiding the sliders 3 is bent in a circular arc shape forwardly, and a hole of each of the sliders 3 to be inserted in the stay rod 1 is straight line shaped, and the stay rod 1 has a three-point support structure in which two points are supported in the front of the stay rod 1 and one point is supported in the rear of the stay rod 1 when the sliders 3 are slid on the stay rod 1 upwardly and downwardly.

Thus, a sliding motion of the sliders 3 may be more smoothly made than to have a surface contact state where the stay rod 1 is completely surrounded by the sliders 3, and it is easier to manage dimensions of the stay rod 1 and the sliders 3 to guarantee the smooth sliding motion of the sliders 3.

The horizontal portion 7 of the moving bar 9 is formed to connect upper ends of the vertical portions 5.

The front cover 11 is coupled to the moving bar 9 by a friction pivoting bracket 19 that surrounds the horizontal portion 7 of the moving bar 9, includes both ends secured to the front cover 11 and elastically pressurizes the moving bar 9 to generate a friction force between the moving bar 9 and the friction pivoting bracket 19 so that the moving bar 9 may be pivoted around the stay rod 1 forwardly and rearwardly.

A main body 21 is installed at the stay rod 1, wherein the pivoting guide unit 13 is integrated with the main body 21, and the latch unit 17 is installed at the main body 21, and the main body 21 supports lower ends of the driving spring 15.

In other words, the main body 21 is formed of plastic extruded material etc., is integrated with the stay rod 1, serves as the pivoting guide unit 13, and provides a seat surface at which the latch unit 17 may be installed. An upper end of the main body 21 supports the lower ends of the driving spring 15 for supporting the sliders 3, and the main body 21 elastically supports the sliders 3 on an upper side of the stay rod 1.

The pivoting guide unit 13 illustrated in FIG. 6 is integrated with the main body 21 in the shape of an arbitrary block at an upper side than the sliders 3 in a state where the lower ends of the vertical portions 5 of the moving bar 9 are pivotably coupled to the sliders 3. Thus, when the moving bar 9 is raised together with the sliders 3, rear sides of the vertical portions 5 of the moving bar 9 continuously contact each other, and the vertical portions 5 of the moving bar 9 are inclined forwardly due to the raised slider 3. Unlike in the present embodiment, the pivoting guide unit 13 may be formed as an additional block separately secured to the stay rod 1 or a structure such as a pin, a rod or the like.

The front cover 11 includes a pair of pivoting limit rods 23 that extend from the main body 21 to perforate the main body 21 and limit displacement in which a lower side of the front cover 11 is pivoted forwardly, and a pair of pivoting limit protrusions 25 are formed at ends of the pivoting limit rods 23. A pair of pivoting limit units 27 are integrated with the main body 21, interfere with the pivoting limit protrusions 25 of the pivoting limit rods 23 and limit displacement in which the lower side of the front cover 11 is pivoted forwardly.

A pair of lower side guide units 29 are integrated with the main body 21 and guide the lower side of the front cover 11 to be gradually pivoted forwardly when the moving bar 9 is raised toward the stay rod 1, and guide protrusions 31 are integrated with the front cover 11 and protrude from a rear side of the front cover 11 so that the guide protrusions 31 may contact the lower side guide units 29 and may be guided.

Also, the active headrest according to the present embodiment further includes a plurality of sawlike or stair-shaped reversal prevention protrusions 33 disposed at upper sides of the lower side guide units 29 of the main body 21 so that the guide protrusions 31 may be caught in the sawlike or stair-shaped reversal prevention protrusions 33 and prevented from being moved to the rear side of the front cover 11.

A lock bar 35 is integrated with the moving bar 9 at a lower side of the horizontal portion 7 of the moving bar 9 so that the lock bar 35 may be secured to or released from the moving bar 9 by the latch unit 17.

Figure 23:
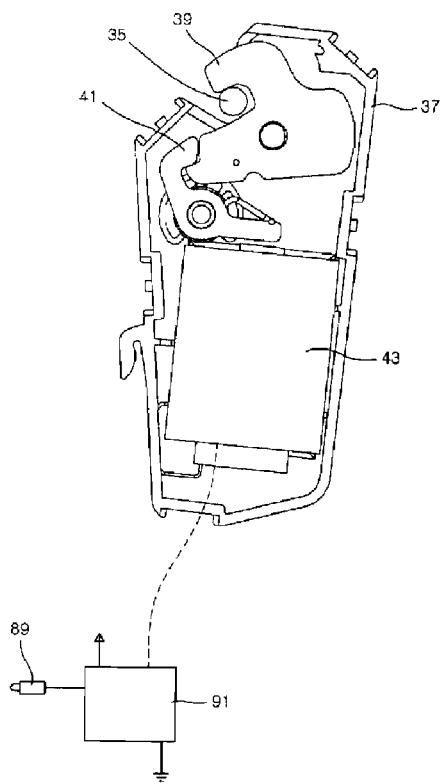
FIG. 23 is a perspective view of a latch unit having an actuator, according to an embodiment of the present invention.

The latch unit 17 includes: a housing 37; a latch lever 39 that secures or releases the lock bar 35 as the latch lever 39 is pivoted around the housing 37; a release lever 41 that prevents or releases pivoting of the latch lever 39 as the latch lever 39 is pivoted around the housing 37; and an actuator 43 that pivots the release lever 41 so that the release lever 41 may allow pivoting of the latch lever 39 due to straight line displacement generated by an electrical signal input from the outside (see FIG. 23).

In other words, in the present embodiment, components such as the latch lever 39, the release lever 41, and the actuator 43 that are integrally disposed in the housing 37 and are modulated are coupled to the main body 21.

Alternatively, the latch unit 17 may include the latch lever 39 that is installed in the housing 37 to release the secured state of the lock bar 35 and the release lever 41 that prevents or releases pivoting of the latch lever 39 as the latch lever 39 is pivoted around the housing 37, wherein an external wire may be connected to the release lever 41 to provide a tensile force from the outside and to pivot the release lever 41.

Figure 24:
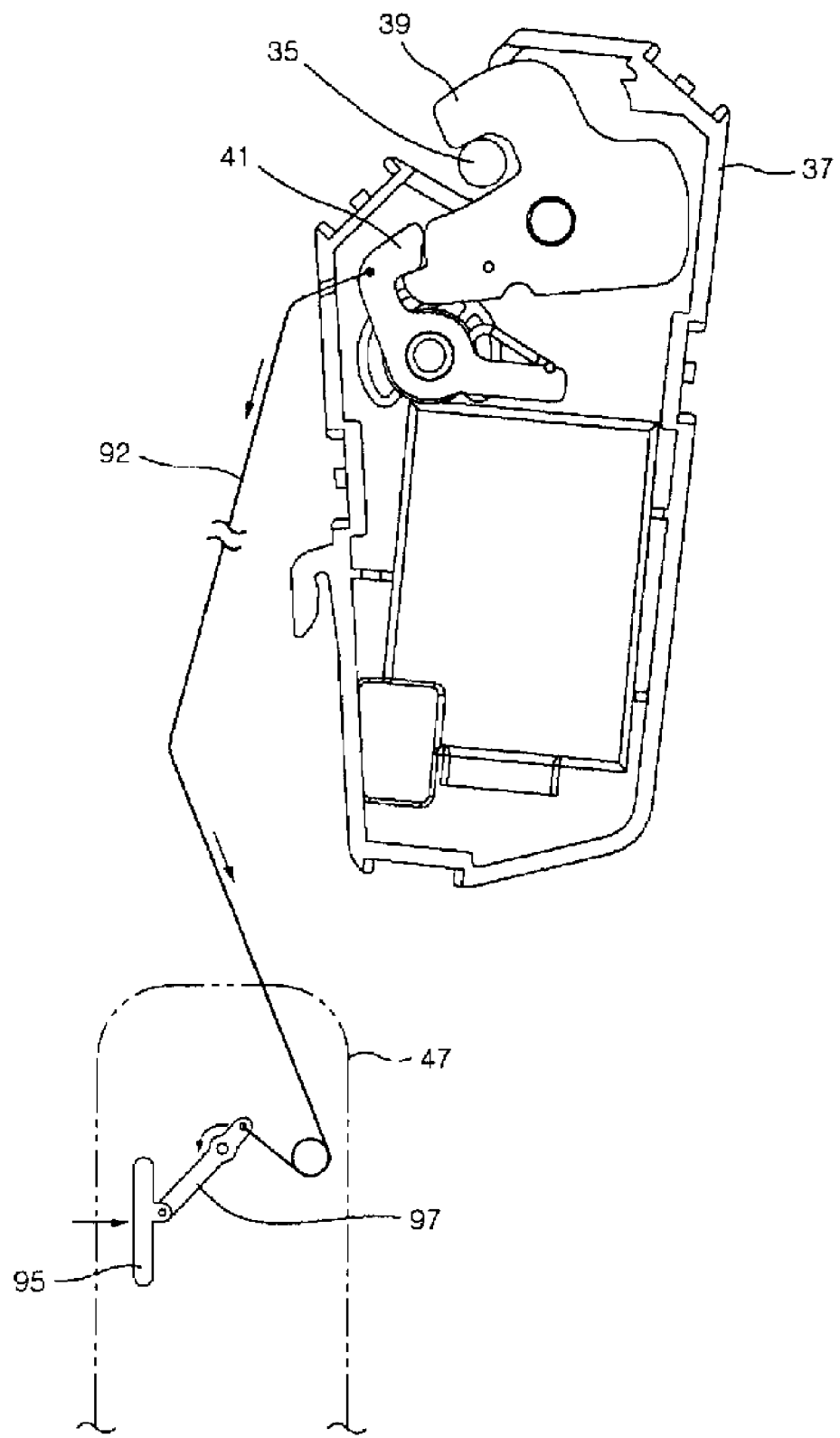
FIG. 24 is a perspective view of a latch unit that operates by a wire, according to an embodiment of the present invention.

In this case, the latch unit 17 may have a mechanical operating structure in which movement of a sensing plate that is installed at the seat back 47 and operates due to force applied by an upper body of the passenger is converted into a tensile force to be applied on the release lever 41 via a wire, a link or the like (see FIG. 24).

An operation of the active headrest of FIGS. 1 through 7 having the above structure will be described with reference to FIGS. 8 through 11.

First, the active headrest of FIGS. 1 through 7 may perform two functions. In detail, the active headrest of FIGS. 1 through 7 may perform a lower side swinging function in which the lower side of the front cover 11 is pivoted forwardly and rearwardly and the head and the neck of a passenger are more comfortably supported according to user's convenience, as illustrated in FIG. 8, and a neck injury preventing function in which the front cover 11 protrudes from a front upper side of the car during a rear-end collision and supports the head and the neck of the passenger to prevent injury of the neck of the passenger, as illustrated in FIG. 9.

First, in the function of swinging the lower side of the front cover 11 illustrated in FIG. 8, the horizontal portion 7 of the moving bar 9 and the upper side of the front cover 11 are coupled by the friction pivoting bracket 19. Thus, when the user pivots the lower side of the front cover 11 forwardly and rearwardly, the friction pivoting bracket 19 and the front cover 11 are pivoted around the horizontal portion 7 of the moving bar 9.

Of course, the state where the front cover 11 is pivoted as described above is maintained to be stable by a friction force between the friction pivoting bracket 19 and the horizontal portion 7 of the moving bar 9 that is generated by an elastic pressure applied on a circumferential surface of the horizontal portion 7 of the moving bar 9.

Thus, the passenger pivots the front cover 11 at a desired angle by hand to support his/her head and neck so that the passenger may be in an easy and comfortable position.

A range where the lower side of the front cover 11 is swung is limited to a range where the pivoting limit protrusions 25 of the pivoting limit rods 23 are limited by the pivoting limit units 27 of the main body 21.

Next, in the neck injury preventing function of FIG. 9, the front cover 11 is in the state of the left side of FIG. 9 in an ordinary state. In this case, the moving bar 9 and the sliders 3 are secured by the latch unit 17 in a state where the moving bar 9 and the sliders 3 compress the driving spring 15 and are fallen.

In other words, the lock bar 35 of the moving bar 9 is caught in the latch lever 39 and thus, the moving bar 9 prevents the sliders 3 from being raised by an elastic force applied on the sliders 3.

In the above-described state, when an electrical signal is applied to the actuator 43 by a unit for sensing a situation where injury of the neck of the passenger needs to be prevented, such as an acceleration sensor or the like, in the event of a rear-end collision of the car, the actuator 43 operates the release lever 41 to pivot the latch lever 39 so that the lock bar 35 may be released from the latch lever 39.

Thus, the moving bar 9 is moved upwardly together with the sliders 3 by an elastic force of the driving spring 15 applied on the sliders 3.

In this case, the moving bar 9 is moved upwardly by the pivoting guide unit 13 integrated with the main body 21 and is pivoted in a direction in which the upper side of the moving bar 9 is inclined forwardly. Simultaneously, the guide protrusions 31 of the front cover 11 contact the lower side guide unit 29 of the main body 21 and are guided so that the lower side of the front cover 11 may be gradually pivoted forwardly.

When the guide protrusions 31 of the front cover 11 escape from the lower side guide units 29, the guide protrusions 31 are caught in the reversal prevention protrusions 33, and the front cover 11 is prevented from being moved back by force reversely applied by the passenger (see FIG. 11).

As described above, in the event of a rear-end collision of the car, the front cover 11 is moved forwardly and rearwardly, and the head and the neck of the passenger are properly supported so that injury of the neck of the passenger may be effectively prevented.

When the moving bar 9 and the sliders 3 are again fallen and the lock bar 35 is returned to its original position so that the lock bar 35 may be caught in the latch lever 39 after the above-described operation, the active headrest may be reused without any maintenance.

Figure 12:
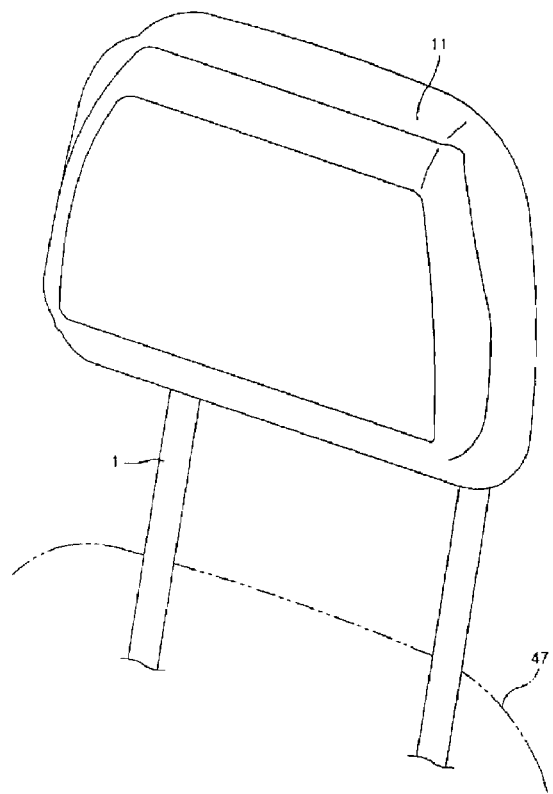
FIG. 12 is a perspective view of an active headrest according to another embodiment of the present invention.
Figure 13:
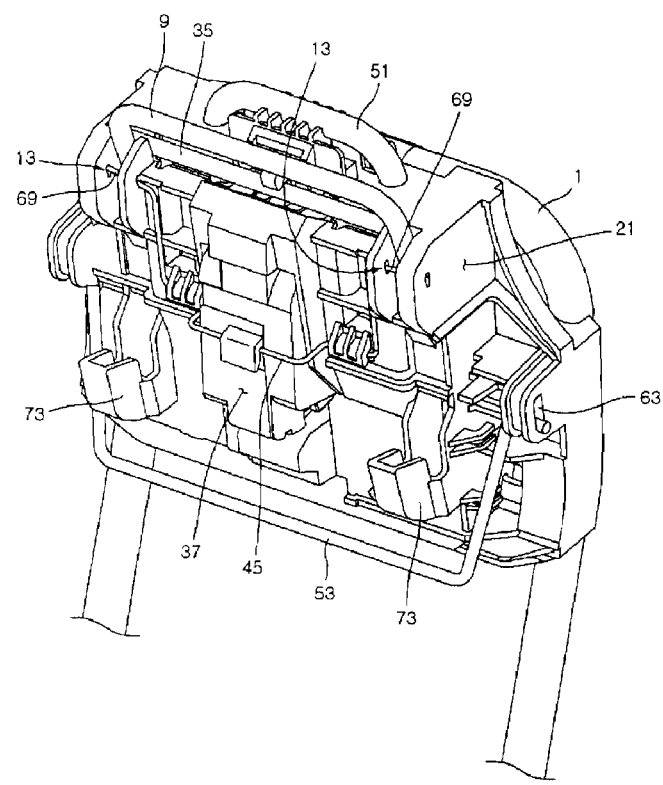
FIG. 13 is a perspective view illustrating a state where a front cover of the active headrest of FIG. 12 is removed.
Figure 14:
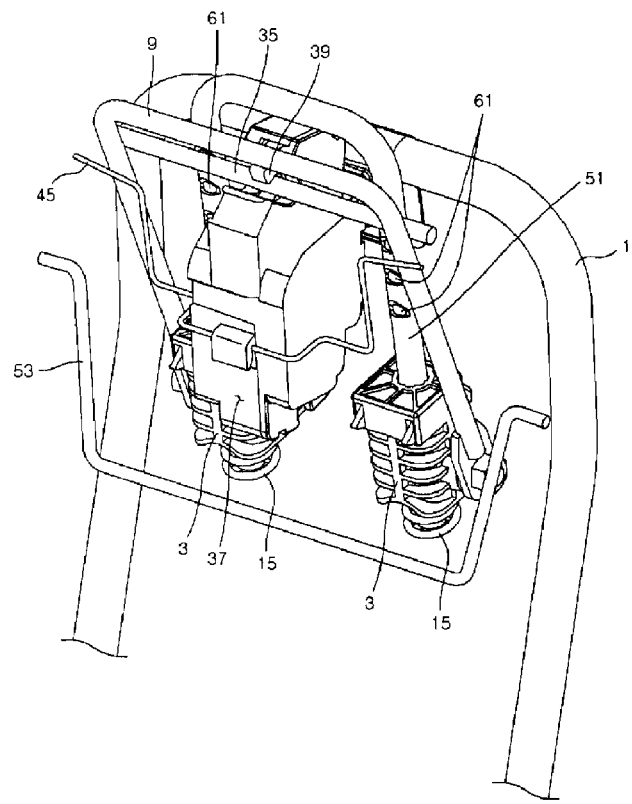
FIG. 14 is a perspective view illustrating a state where a main body of the active headrest of FIG. 12 is removed.
Figure 15:
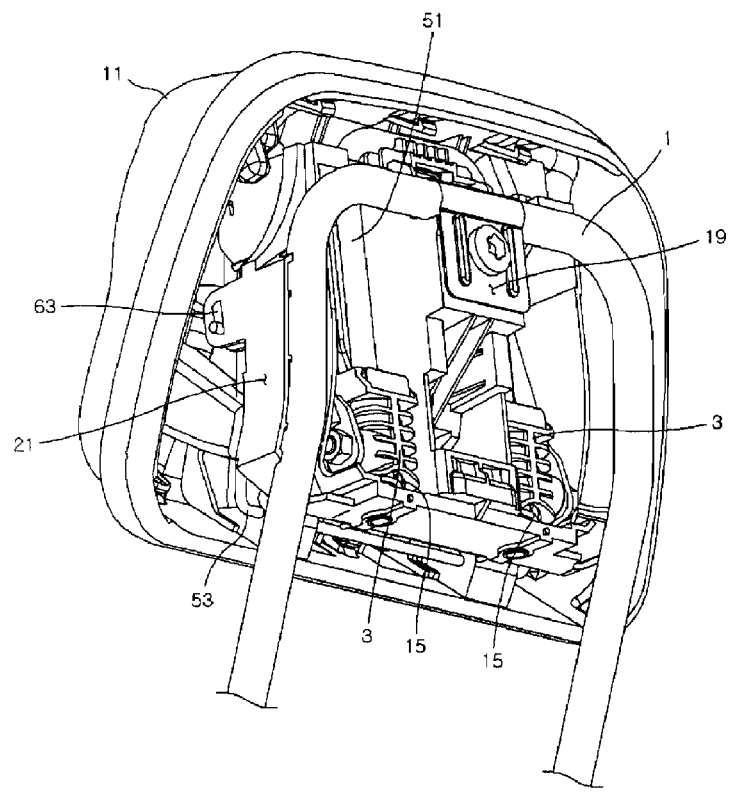
FIG. 15 is a perspective view illustrating a rear side of the active headrest of FIG. 12.
Figure 16:
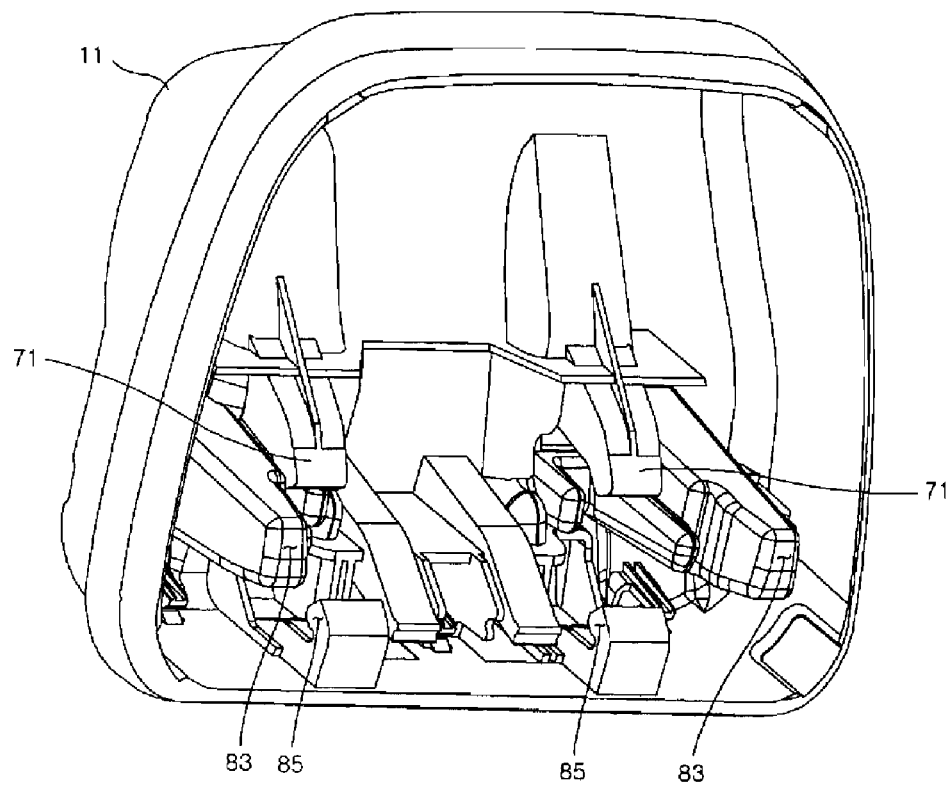
FIG. 16 is a perspective view of a rear side of the front cover.
Figure 17:
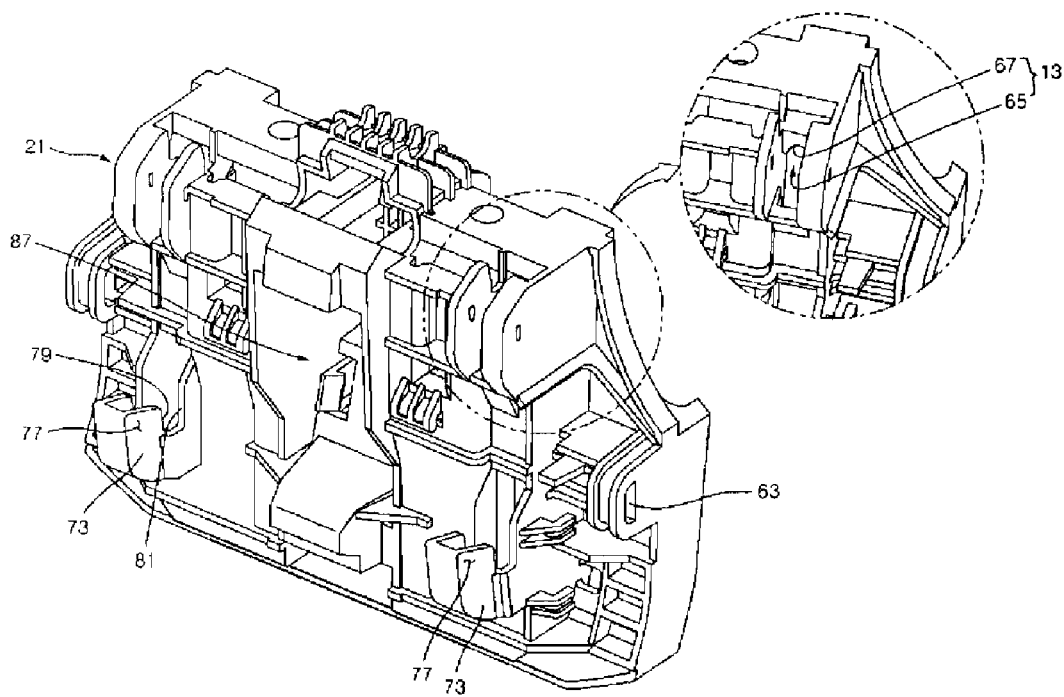
FIG. 17 is a perspective view of a front side of the main body.
Figure 18:
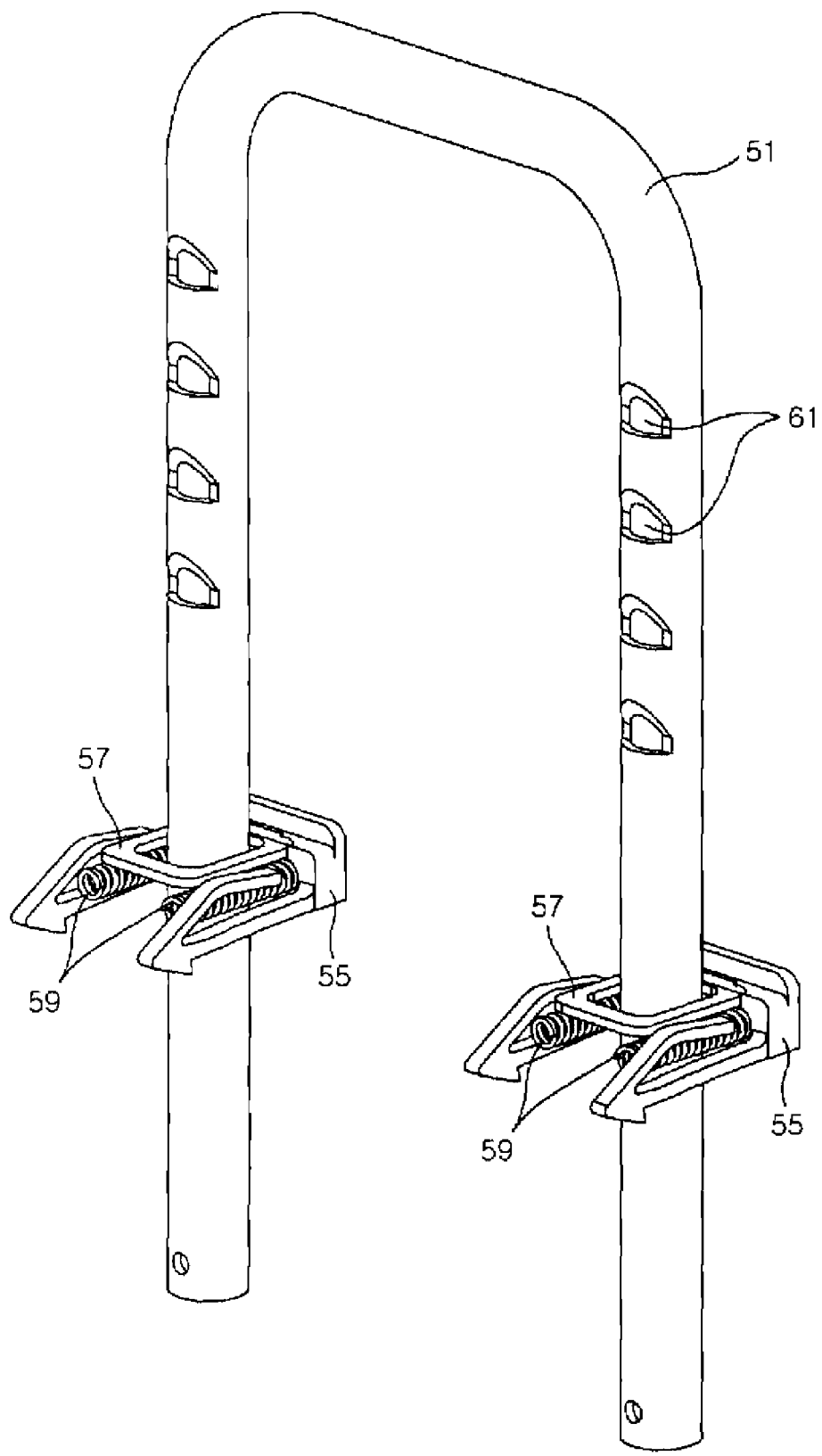
FIG. 18 is a perspective view of a stay rod and a lock plate of the active headrest of FIG. 12.
Figure 19:
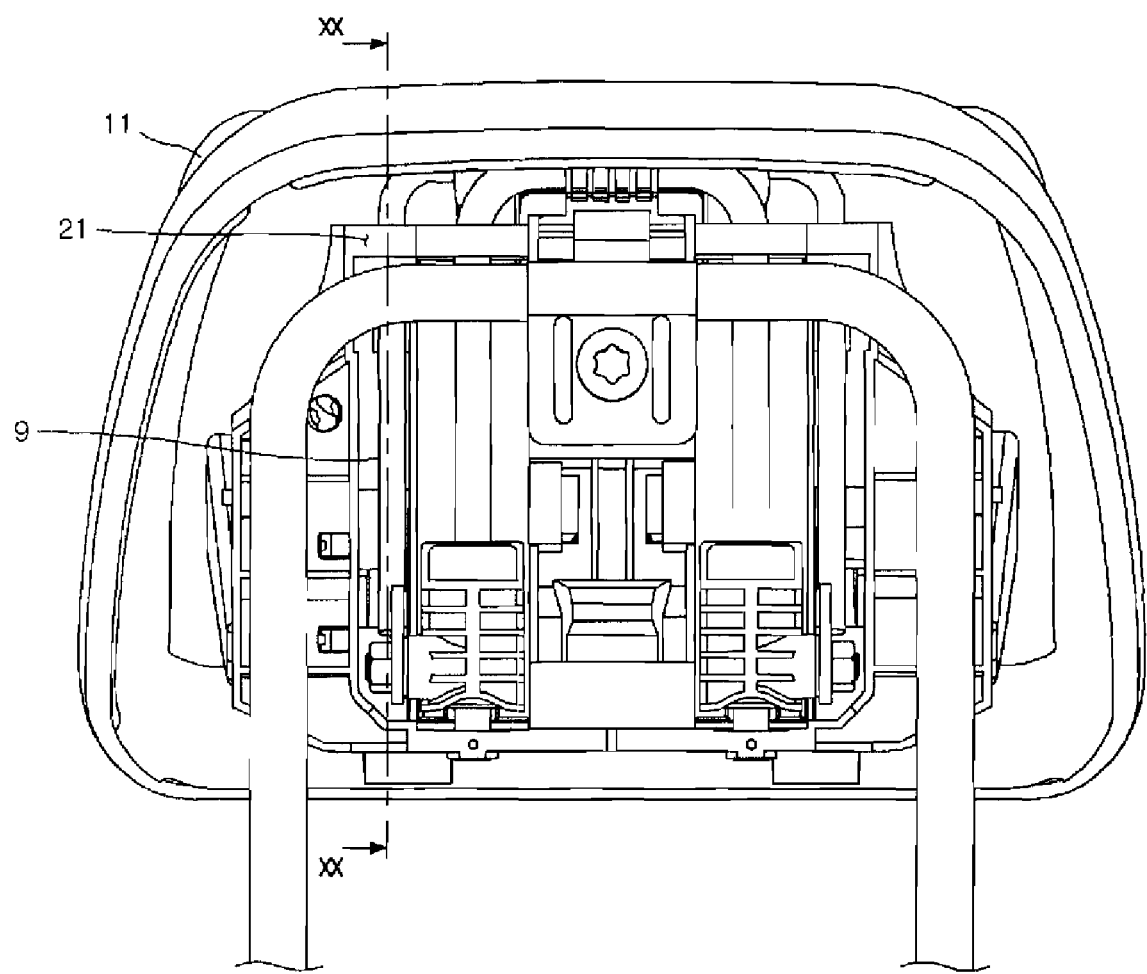
FIG. 19 is a perspective view of a rear side of the active headrest of FIG. 12.
Figure 20:
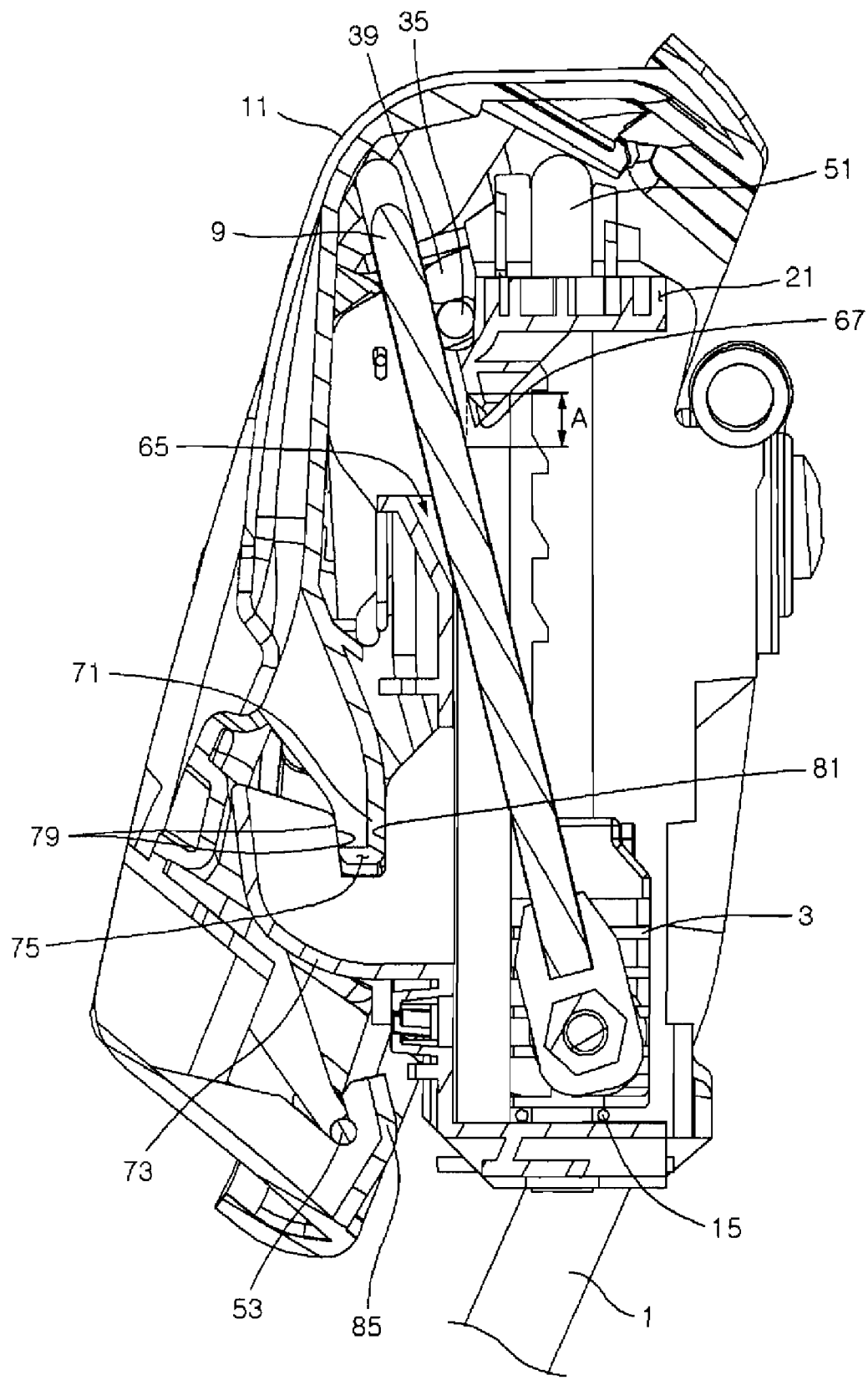
FIG. 20 is a cross-sectional view of the active headrest of FIG. 12 taken along line XX-XX of FIG. 19.

FIGS. 12 through 24 are perspective views of an active headrest according to another embodiment of the present invention, wherein a guide bar 51 is provided separately from a stay rod 1 installed at an upper side of a seat back 47. FIG. 12 is a perspective view of an active headrest according to another embodiment of the present invention, and FIG. 13 is a perspective view illustrating a state where a front cover of the active headrest of FIG. 12 is removed, and FIG. 14 is a perspective view illustrating a state where a main body of the active headrest of FIG. 13 is removed, and FIG. 15 is a perspective view illustrating a rear side of the active headrest of FIG. 12, and FIG. 16 is a perspective view of a rear side of the front cover, and FIG. 17 is a perspective view of a front side of the main body, and FIG. 18 is a perspective view of a stay rod and a lock plate of the active headrest of FIG. 12, and FIG. 19 is a perspective view of a rear side of the active headrest of FIG. 12, and FIG. 20 is a cross-sectional view of the active headrest of FIG. 12 taken along line XX-XX of FIG. 19, and FIG. 21 is a perspective view illustrating a function of swinging a lower side of the front cover of the active headrest of FIG. 12, and FIG. 22 is a perspective view illustrating a function of preventing injury of the neck of a passenger of the active headrest of FIG. 12, and FIG. 23 is a perspective view of a latch unit having an actuator, according to an embodiment of the present invention, and FIG. 24 is a perspective view of a latch unit that operates by a wire, according to an embodiment of the present invention.

Referring to FIGS. 12 through 20, the active headrest according to the present embodiment includes: the guide bar 51 that is installed at the upper side of the seat back 47; a pair of sliders 3 that are slidable on the guide bar 51 upwardly and downwardly; a moving bar 9 pivotably coupled to the sliders 3 so that the moving bar 9 may be pivoted around the guide bar 51 forwardly and rearwardly; a front cover 11 coupled to an upper side of the moving bar 9; a pivoting guide unit 13 that pivots the upper side of the moving bar 9 forwardly as the sliders 3 are raised toward the guide bar 51; a driving spring 15 that provides an elastic force for pushing the sliders 3 upwardly; and a latch unit 17 that maintains a state where the sliders 3 compress the driving spring 15 and are fallen.

In the present embodiment, the main body 21 is pivotably installed at the stay rod 1 forwardly and rearwardly, and the guide bar 51 is installed at the main body 21 to guide the sliders 3 upwardly and downwardly, and the sliders 3 are inserted in the guide bar 51 to be slidable on the guide bar 51, and the front cover 11 is coupled to the moving bar 9 to be pivoted around the moving bar 9 forwardly and rearwardly, and the main body 21 is coupled to the stay rod 1 by a friction pivoting bracket 19 that surrounds the upper side of the stay rod 1 elastically and generates a friction force between the stay rod 1 and the friction pivoting bracket 19 so that the main body 21 may be pivoted around the stay rod 1 forwardly and rearwardly.

Figure 21:
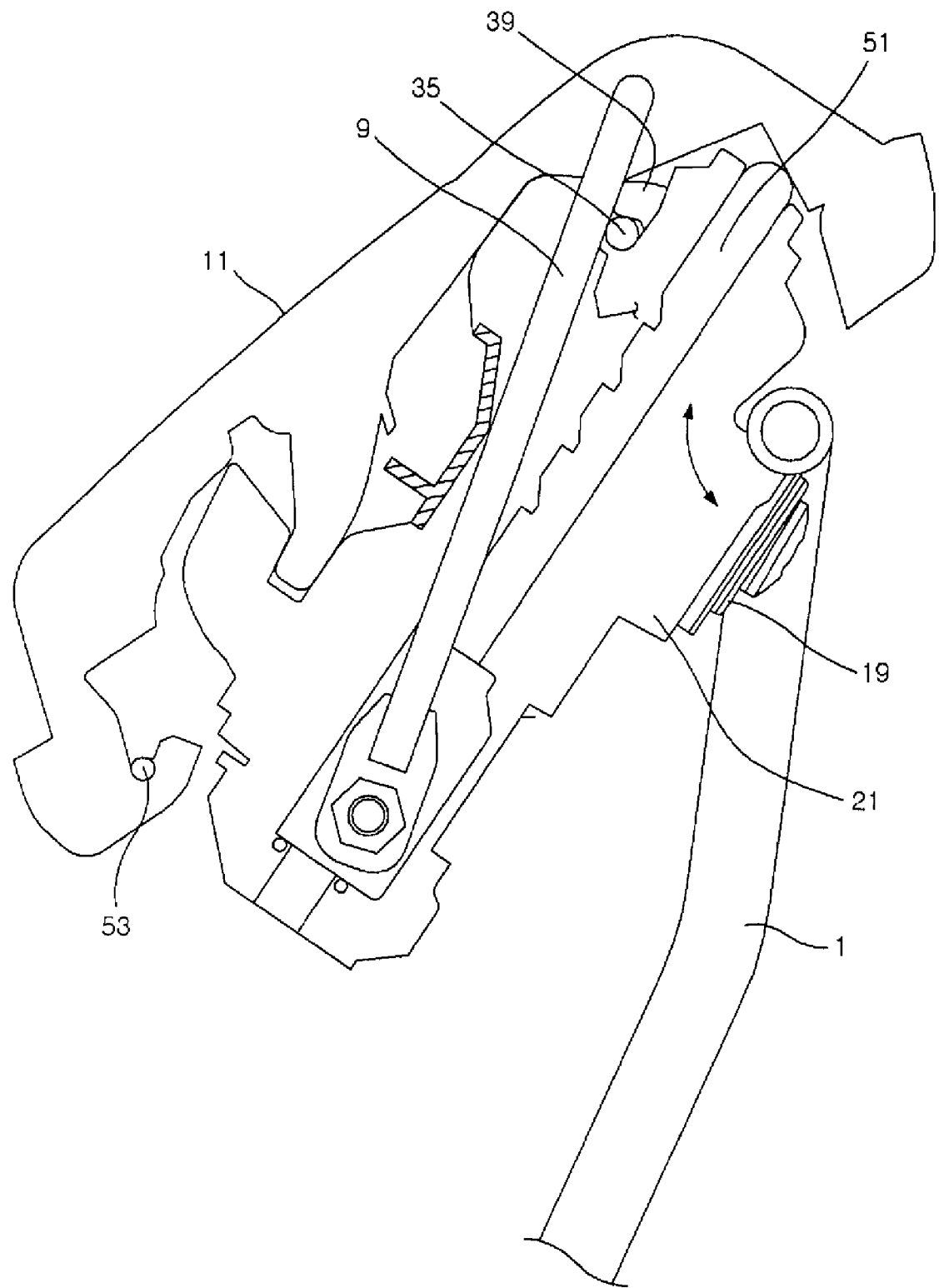
FIG. 21 is a perspective view illustrating a function of swinging a lower side of the front cover of the active headrest of FIG. 12.
Figure 22:
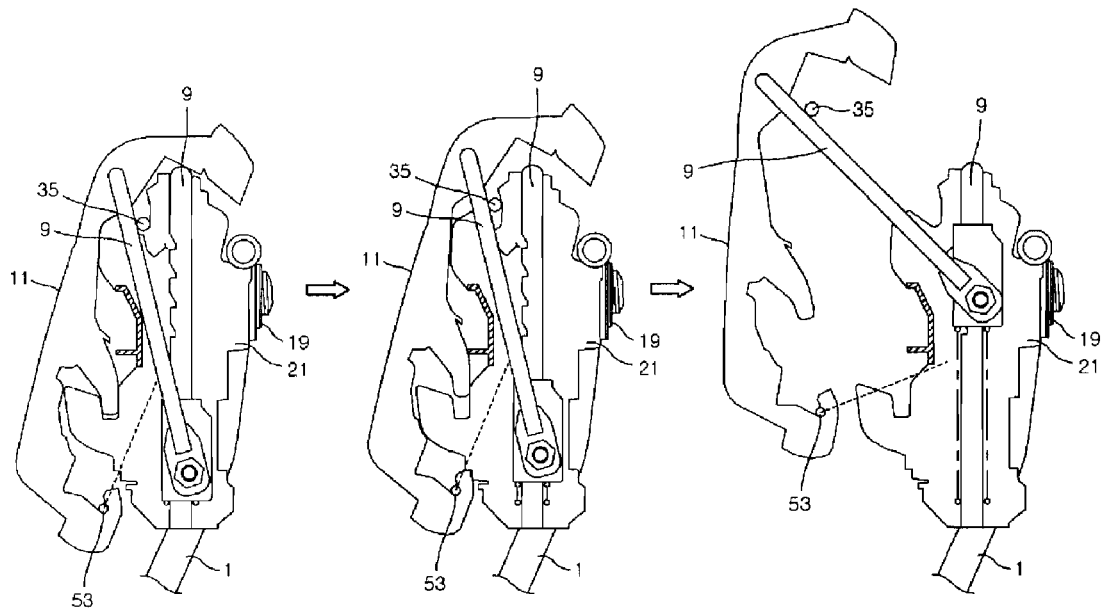
FIG. 22 is a perspective view illustrating a function of preventing injury of the neck of a passenger of the active headrest of FIG. 12.

Thus, in the present embodiment, the main body 21, the guide bar 51, the sliders 3, the moving bar 9, and the front cover 11 as a single body may be pivoted around the stay rod 1 by the friction pivoting bracket 19 forwardly and rearwardly, as illustrated in FIG. 21, and the pivoting state is elastically maintained by an elastic force generated by the friction pivoting bracket 19 so that the lower side of the front cover 11 may be pivoted forwardly and rearwardly and a lower side swinging function for adjusting more conveniently the head and the neck of a user according to user's convenience may be performed.

In the present embodiment, the sliders 3 are not installed at the stay rod 1 but are installed at the guide bar 51 installed at the main body 21 to be raised or fallen toward the guide bar 51 upwardly and downwardly. Thus, even when specification of the stay rod 1 is varied according to seats, if the main body 21 is adjusted to be coupled to the stay rod 1, the active headrest of FIG. 12 may be applied to various seats without any special modification.

In the present embodiment, the guide bar 51 provides two parallel straight line portions to the main body 21 so as to guide relative straight line movement to the main body 21. Thus, the pair of sliders 3 are installed at both sides of the stay rod 1 to be movable to the main body 21 along the guide bar 51 upwardly and downwardly.

The driving spring 15 that elastically supports the sliders 3 upwardly is compressed between the main body 21 and the sliders 3, and the moving bar 9 includes two vertical portions 5 and a horizontal portion 7 for connecting the vertical portions 5, and lower ends of the vertical portions 5 are pivotably coupled to the sliders 3 so that the vertical portions 5 may be pivoted around the guide bar 51 forwardly and rearwardly.

The front cover 11 is coupled to the upper side of the moving bar 9 so that an upper side of the front cover 11 may be pivoted, and the active headrest of FIG. 12 further includes a pivoting limit link 53 that is installed to connect a space between the front cover 11 and the main body 21 and limits the amount of pivoting of the front cover 11 around the main body 21.

In the present embodiment, the guide bar 51 is formed of a circular sectional rod that is bent in a reverse U-shape and is secured to the main body 21. The active headrest of FIG. 12 further includes a falling prevention mechanism that allows raising of the sliders 3 toward the guide bar 51 and limits falling thereof.

The falling prevention mechanism includes: a pair of lock plates 55 perforating the sliders 3; a pair of securing members 57 integrally coupled to the lock plates 55 and surrounding one side of the guide bar 51; a pair of bias springs 59 elastically supporting the lock plates 55 with respect to the sliders 3; and a pair of latch grooves 61 formed to limit movement of the sliders 3 by allowing raising of the securing member 57 and limiting falling thereof if the securing members 57 are inserted in the guide bar 51.

Thus, after the sliders 3 are raised by force of the driving spring 15 and one securing member 57 pass through the latch grooves 61, the securing members 57 are caught in the latch grooves 61 and prevent falling of the sliders 3. Thus, after the front cover 11 is moved forwardly so as to protect the body of the passenger forwardly and upwardly, the front cover 11 connected to the sliders 3 via the moving bar 9 is not moved rearwardly and downwardly by a load applied by the body of the passenger.

Of course, when the sliders 3 are again pressurized forwardly, the securing members 57 escape from the latch grooves 61 and the sliders 3 are moved downwardly, the sliders 3 may be returned to their initial states. In this state, the securing members 57 are compressed on a front side of the guide bar 51 by elastic force of the bias springs 59, and if the sliders 3 are again raised, the sliders 3 may be quickly inserted in the latch grooves 61.

Both ends of the pivoting limit link 53 are movably inserted in a slot 63 formed in the main body 21, and a middle portion of the pivoting limit link 53 is pivotably coupled to the front cover 11.

The pivoting guide unit 13 includes: a guide hole 65 formed in the main body 21 so that the vertical portions 5 of the moving bar 9 may be movably perforated through the guide hole 65 upwardly and downwardly; a rear guide unit 67 that forms an upper side of the guide hole 65 and if the moving bar 9 is raised together with the sliders 3, allows a rear side of the moving bar 9 to contact the rear guide unit 67; and a front guide 69 that is disposed in the guide hole 65 to contact a front side of the moving bar 9 and to limit the amount of pivoting of the upper side of the moving bar 9 toward its front lower side.

For your reference, the guide hole 65 is illustrated in FIG. 17 in detail. Referring to FIG. 13, in the present embodiment, both ends of a confinement wire 45 constitute the front guide 69 as will be described later.

The front cover 11 includes a cover side securing hook 71 that protrudes from a rear side of the front cover 11 toward the main body 21, and the main body 21 includes a body side securing hook 73 that is coupled to the cover side securing hook 71 and prevents shake of the front cover 11 with respect to the main body 21.

The cover side securing hook 71 includes a lower side protrusion 75 that extends from the front cover 11 rearwardly and then extends from the front cover 11 downwardly, and the body side securing hook 73 includes an upper side protrusion 77 that extends from the main body 21 forwardly and then extends from the main body 21 upwardly, and mutual confinement sides 79 that limit straight line motion of the front cover 11 forwardly from the main body 21, are mutually formed between the lower side protrusion 75 and the upper side protrusion 77 (see FIG. 20).

The rear guide unit 67 is separated from the rear side of the moving bar 9 in an ordinary state where the cover side securing hook 71 and the body side securing hook 73 are coupled to each other. A separation distance A between the rear guide unit 67 and the moving bar 9 is set to a distance at which the mutual confinement sides 79 escape from each other and the front cover 11 makes a straight line motion forwardly from the main body 21 as the moving bar 9 is moved by the sliders 3 upwardly.

A neck injury preventing function of preventing injury of the neck by supporting the head and the neck of the passenger when the front cover 11 protrudes from the front upper side of the car in the event of a rear-end collision to be performed in the present embodiment will be described with reference to FIG. 22 together with describing the meaning of the separation distance A as below.

When the latch unit 17 releases the lock bar 35 integrated with the moving bar 9 from the ordinary state of the left side of FIG. 22 as will be described later, the sliders 3 start being raised along the guide bar 51 by force of the driving spring 15.

In this case, first, the front cover 11 is not moved forwardly but is moved only upwardly, as illustrated in the middle of FIG. 22. This is because of the mutual confinement sides 79 between the cover side securing hook 71 and the body side securing hook 73. The front cover 11 needs to be raised together with the sliders 3 until the mutual confinement sides 79 are separated from each other and are released therefrom.

Thus, in order only the front cover 11 to be raised as described above, the rear side of the moving bar 9 and the rear guide unit 67 need to be separated from each other. The separation distance A is set to a distance at which the cover side securing hook 71 and the body side securing hook 73 are released from each other and the moving bar 9 is raised together with the sliders 3 until the front cover 11 is moved forwardly, as described above.

In this case, the pivoting limit link 53 is raised together with the raised front cover 11. The slot 63 of the main body 21 in which both ends of the pivoting limit link 53 are inserted is formed to be long upwardly so as to absorb displacement generated in the pivoting limit link 53.

In other words, the slot 63 of the main body 21 in which both ends of the pivoting limit link 53 are inserted is formed upwardly and downwardly to be equal to or greater than a length of the mutual confinement sides 79 so that both ends of the pivoting limit link 53 may be raised while the mutual confinement sides 79 escape from each other as the moving bar 9 is moved by the sliders 3 upwardly.

After that, the rear side of the moving bar 9 contacts the rear guide unit 67 and is guided. Thus, an upper end of the moving bar 9 is pivoted forwardly around ends secured to the sliders 3 as the sliders 3 are raised. Thus, the front cover 11 is moved forwardly and upwardly to support the rear side of the passenger, and the pivoting limit link 53 is pivoted and limits a degree at which the lower side of the front cover 11 is pivoted forwardly, in the state of the right side of FIG. 22 so that a function of preventing injury of the neck of the passenger may be performed.

The body side securing hook 73 includes a rear confinement side 81 that is opposite to the mutual confinement sides 79 so as to limit moving back of the rear side of the lower side protrusion 75. Thus, the rear confinement side 81 limits moving of the front cover 11 with respect to the main body 21 forwardly and rearwardly.

In detail, as illustrated in FIG. 20, the lower side protrusion 75 of the cover side securing hook 71 is inserted in the body side securing hook 73, and a front side of the cover side securing hook 71 is confined by the mutual confinement sides 79, and a rear side of the cover side securing hook 71 is confined by the rear confinement side 81 so that the front cover 11 may be confined forwardly and rearwardly with respect to the main body 21.

In particular, in the present embodiment, the cover side securing hook 71 is disposed to be symmetrical with lower both sides from the center of the front cover 11. This is because the upper side of the front cover 11 is coupled to the moving bar 9 and the lower both sides of the front cover 11 are secured by the cover side securing hooks 71 and the body side securing hook 73 so that the front cover 11 may be maintained to be stable and solid with respect to the main body 21.

Furthermore, a pair of support bosses 83 protrude from both sides of the rear side of the front cover 11 so that the support bosses 83 may be closely adhered to the front side of the main body 21 in an ordinary state in which the cover side securing hook 71 and the body side securing hook 73 are coupled to each other, and a pair of cover side securing hooks 71 are disposed between the support bosses 83 so that the front cover 11 may be completely prevented from being shaken with respect to the main body 21.

For your reference, the ordinary state is a general state in which a rear-end collision does not occur and the front cover 11 is not moved in forward and upward directions. The forward and upward directions are identical with front and rear sides of the car.

Link securing hooks 85 are disposed on lower sides of the cover side securing hooks 71, and a middle portion of the pivoting limit link 53 is pivotably coupled to the link securing hooks 85.

Also in the present embodiment, the moving bar 9 further includes a lock bar 35 that is secured to or released from the moving bar 9 by the latch unit 17, as described above.

The latch unit 17 includes: a housing 37; a latch lever 39 that is disposed in the housing 17 and secures or releases the lock bar 35 as the latch lever 39 is pivoted around the housing 37; and a release lever 41 that prevents or releases pivoting of the latch lever 39 as the latch lever 39 is pivoted around the housing 37.

A latch installation unit 87 is integrated with the middle portion of the main body 21 so as to insert the housing 37 of the latch unit 17 in the latch installation unit 87 from forward, and a front side of the housing 37 inserted in the latch installation unit 87 is confined in the middle portion of the confinement wire 45 having both ends coupled to each other to perforate two barrier walls that form the guide hole 65 so that the housing 37 may not escape from the main body 21.

In the present embodiment, the latch unit 17 has a structure in which an actuator that operates by electrical force is installed. Thus, as illustrated in FIG. 23, an actuator 43 that generates straight line displacement by an electrical signal applied from the outside and pivots the release lever 41 so that the release lever 41 may allow pivoting of the latch lever 39, is installed in the housing 37 of the latch unit 17. The actuator 43 is connected to a controller 91 that generates a signal for driving the actuator 43 in response to a signal of a sensor 89 for sensing a rear-end situation of the car.

Of course, the latch unit 17 may operate mechanically as well as the above-described operating manner. Thus, as illustrated in FIG. 24, a wire 92 is connected to the release lever 41 installed in the housing 37 of the latch unit 17 from the outside to provide a tensile force from the outside to pivot the release lever 41. When the wire 92 is installed at the seat back 47 and a sensing plate 95 is pressurized by the body of the passenger, the wire 92 may be pivoted and may be connected to an operating lever 97 that pulls the wire 92.

As described above, in the active headrest according to the present invention, the active headrest has a simple structure so that injuries of the neck and a portion near the neck of a passenger can be effectively prevented in the event of a rear-end collision and forward and rearward inclinations of the active headrest can be adjusted in an ordinary driving state to improve user's convenience and shake of the active headrest with respect to a vehicle seat in an ordinary state can be prevented to suppress noise and vibration and the quality of the vehicle seat and the car can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An active headrest comprising:
    a guide bar installed at an upper side of a seat back;
    a pair of sliders that are slidable on the guide bar upwardly and downwardly;
    a moving bar pivotably coupled to the sliders so that the moving bar is pivoted around the guide bar forwardly and rearwardly;
    a front cover coupled to an upper side of the moving bar;
    a pivoting guide unit pivoting an upper side of the moving bar forwardly as the sliders are raised toward the guide bar;
    a driving spring providing an elastic force for pushing the sliders upwardly; and
    a latch unit maintaining a state where the sliders compress the driving spring and are fallen,
    wherein a stay rod is installed at the upper side of the seat back, and the guide bar is integrated with the stay rod, and
    wherein the sliders are slidable on the stay rod upwardly and downwardly, and the front cover is coupled to the moving bar by a friction pivoting bracket that surrounds an upper side of the moving bar elastically and generates a friction force between the moving bar and the friction pivoting bracket so that the moving bar is pivoted around the stay rod forwardly and rearwardly.

2. The active headrest of claim 1, further comprising a main body installed at the stay rod, wherein the pivoting guide unit is integrated with the main body, and the latch unit is installed at the main body, and the main body supports lower end of the driving spring.

3. The active headrest of claim 2, wherein the front cover comprises pivoting limit rods that extend from the main body to perforate the main body and limit displacement in which a lower side of the front cover is pivoted forward, and pivoting limit protrusions are formed at ends of the pivoting limit rods, and pivoting limit units are integrated with the main body, interfere with the pivoting limit protrusions of the pivoting limit rods and limit displacement in which the lower side of the front cover is pivoted forwardly.

4. The active headrest of claim 2, wherein lower side guide units are integrated with the main body and guide the lower side of the front cover to be gradually pivoted forwardly when the moving bar is raised toward the stay rod, and guide protrusions are integrated with the front cover and protrude from a rear side of the front cover so that the guide protrusions contact the lower side guide units and are guided, and the active headrest further comprises a plurality of stair-shaped reversal prevention protrusions disposed at upper sides of the lower side guide units of the main body so that the guide protrusions are caught in the reversal prevention protrusions and prevented from being moved to the rear side of the front cover.

5. The active headrest of claim 4, wherein a lock bar is integrated with the moving bar so that the lock bar is selectively secured to and released from the moving bar by the latch unit, and the latch unit comprises a housing, a latch lever that selectively secures and releases the lock bar as the latch lever is pivoted around the housing, a release lever that selectively prevents and releases pivoting of the latch lever as the latch lever is pivoted around the housing, and an actuator that pivots the release lever so that the release lever allows pivoting of the latch lever due to straight line displacement generated by an electrical signal input from the outside.

6. The active headrest of claim 4, wherein a lock bar is integrated with the moving bar so that the lock bar is selectively secured to and released from the moving bar by the latch unit, and the latch unit comprises a housing, a latch lever that selectively secures and releases the lock bar as the latch lever is pivoted around the housing, and a release lever that selectively prevents and releases pivoting of the latch lever as the latch lever is pivoted around the housing, and a wire is connected to the release lever installed in the housing of the latch unit from the outside to provide a tensile force from the outside to pivot the release lever.

7. An active headrest comprising:
    a guide bar installed at an upper side of a seat back;
    a pair of sliders that are slidable on the guide bar upwardly and downwardly;
    a moving bar pivotably coupled to the sliders so that the moving bar is pivoted around the guide bar forwardly and rearwardly;
    a front cover coupled to an upper side of the moving bar;
    a pivoting guide unit pivoting an upper side of the moving bar forwardly as the sliders are raised toward the guide bar;
    a driving spring providing an elastic force for pushing the sliders upwardly; and
    a latch unit maintaining a state where the sliders compress the driving spring and are fallen,
    wherein a stay rod is installed at the upper side of the seat back, and a main body is installed at the upper side of the seat back via the stay rod, and the guide bar is installed at the main body separately from the stay rod, and
    wherein the sliders are inserted in the guide bar to be slidable on the guide bar, and the front cover is coupled to the moving bar to be pivoted around the moving bar forwardly and rearwardly, and the main body is coupled to the stay rod by a friction pivoting bracket that surrounds an upper side of the stay rod elastically and generates a friction force between the stay rod and the friction pivoting bracket so that the main body is pivoted around the stay rod forwardly and rearwardly.

8. The active headrest of claim 7, further comprising a pivoting limit link installed to connect a space between the front cover and the main body and limiting the amount of pivoting of the front cover around the main body.

9. The active headrest of claim 8, further comprising a falling prevention mechanism allowing raising of the sliders toward the guide bar and limiting falling thereof, and the falling prevention mechanism comprises:
    a pair of lock plates that perforate the sliders;
    a pair of securing members that are integrally coupled to the lock plates and surround one side of the guide bar;

a pair of bias springs that elastically support the lock plates with respect to the sliders; and a pair of latch grooves formed to limit movement of the sliders by allowing raising of the securing members and limiting falling thereof if the securing members are inserted in the guide bar.

10. The active headrest of claim 9, wherein the pivoting guide unit comprises:

a guide hole formed in the main body so that vertical portions of the moving bar are movably perforated through the guide hole upwardly and downwardly;

a rear guide unit forming an upper side of the guide hole and if the moving bar is raised together with the sliders, allowing a rear side of the moving bar to contact the rear guide unit; and a front guide disposed in the guide hole to contact a front side of the moving bar and to limit the amount of pivoting of the upper side of the moving bar toward a front lower side of the moving bar.

11. The active headrest of claim 10, further comprising:

a cover side securing hook protruding from a rear side of the front cover toward the main body; and a body side securing hook coupled to the cover side securing hook and formed in the main body to prevent shake of the front cover with respect to the main body, wherein both ends of the pivoting limit link are movably inserted in a slot formed in the main body, and a middle portion of the pivoting limit link is pivotably coupled to the front cover.

12. The active headrest of claim 11, wherein the cover side securing hook comprises a lower side protrusion extending from the front cover rearwardly and then extending from the front cover downwardly, and the body side securing hook comprises an upper side protrusion extending from the main body forwardly and then extending from the main body upwardly, and mutual confinement sides limiting straight line motion of the front cover forwardly from the main body and being mutually formed between the lower side protrusion and the upper side protrusion, and the rear guide unit is separated from the rear side of the moving bar in an ordinary state where the cover side securing hook and the body side securing hook are coupled to each other, and a separation distance between the rear guide unit and the moving bar is set to a distance at which the mutual confinement sides escape from each other and the front cover makes a straight line motion forwardly from the main body as the moving bar is moved by the sliders upwardly.

13. The active headrest of claim 12, wherein the cover side securing hook is disposed to be symmetrical with lower both sides from the center of the front cover, and the body side securing hook comprises a rear confinement side that is opposite to the mutual confinement sides so as to limit moving back of a rear side of the lower side protrusion and thus, the rear confinement side limits forwardly and rearwardly moving of the front cover with respect to the main body, and the slot of the main body in which both ends of the pivoting limit link are inserted is formed upwardly and downwardly to be equal to or greater than a length of the mutual confinement sides so that both ends of the pivoting limit link are raised while the mutual confinement sides escape from each other as the moving bar is moved by the sliders upwardly.

14. The active headrest of claim 13, wherein a lock bar that is selectively secured to and released from the moving bar by the latch unit, and the latch unit comprises a housing, a latch lever disposed in the housing and selectively securing and releasing the lock bar as the latch lever is pivoted around the housing, and a release lever selectively preventing and releasing pivoting of the latch lever as the latch lever is pivoted around the housing, and a latch installation unit is integrated with a middle portion of the main body so as to insert the housing of the latch unit in the latch installation unit from forward, and a front side of the housing inserted in the latch installation unit is confined in the middle portion of the confinement wire having both ends coupled to each other to perforate two barrier walls that form the guide hole so that the housing does not escape from the main body, and the front guide that constitutes a moving bar guide unit comprises both ends of the confinement wire.

* * * * *